United States Patent
Norton et al.

(10) Patent No.: US 10,726,851 B2
(45) Date of Patent: Jul. 28, 2020

(54) LOW LATENCY AUDIO STREAM ACCELERATION BY SELECTIVELY DROPPING AND BLENDING AUDIO BLOCKS

(71) Applicant: Sony Interactive Entertainment Inc., Tokyo (JP)

(72) Inventors: Geoffrey Piers Robert Norton, Foster City, CA (US); Jacob P. Stine, La Honda, CA (US); Takayuki Kazama, Castro Valley, CA (US); Dmitri Tolstov, San Carlos, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 23 days.

(21) Appl. No.: 15/693,184

(22) Filed: Aug. 31, 2017

(65) Prior Publication Data
US 2019/0066699 A1    Feb. 28, 2019

(51) Int. Cl.
| G10L 19/00 | (2013.01) |
| G10L 19/005 | (2013.01) |
| G10L 19/02 | (2013.01) |
| G10L 19/022 | (2013.01) |
| G10L 19/16 | (2013.01) |
| G10L 21/055 | (2013.01) |
| G11B 27/10 | (2006.01) |

(52) U.S. Cl.
CPC ......... G10L 19/005 (2013.01); G10L 19/022 (2013.01); G10L 19/0216 (2013.01); G10L 19/167 (2013.01); G10L 21/055 (2013.01); G11B 27/10 (2013.01)

(58) Field of Classification Search
None
See application file for complete search history.

(56) References Cited

U.S. PATENT DOCUMENTS

| 5,903,872 A * | 5/1999 | Fielder | G11B 27/031 704/224 |
| 6,009,386 A * | 12/1999 | Cruickshank | G10L 21/04 704/207 |
| 6,948,123 B2 * | 9/2005 | Endou | G06K 9/6251 715/700 |
| 7,020,603 B2 * | 3/2006 | Lopez-Estrada | G10L 19/00 704/200.1 |
| 7,130,528 B2 * | 10/2006 | Blair | H04N 5/783 386/344 |
| 7,313,519 B2 * | 12/2007 | Crockett | G10L 19/02 704/226 |
| 8,515,770 B2 * | 8/2013 | Keiler | G10L 19/038 704/500 |

(Continued)

OTHER PUBLICATIONS

International Search Report and Written Opinion dated Oct. 4, 2018 for International Patent Application No. PCT/US18/43555.

*Primary Examiner* — Satwant K Singh
(74) *Attorney, Agent, or Firm* — JDI Patent; Joshua D. Isenberg; Robert Pullman (57) ABSTRACT

A method and device for accelerated audio processing in a streaming environment. The method comprises receiving a streaming audio asset, locating a position to ignore processing of an audio block of the streaming audio asset, ignoring the audio block, compensating for the ignored audio block and playing the compensated audio on an audio device.

20 Claims, 9 Drawing Sheets

(56) References Cited

U.S. PATENT DOCUMENTS

| | | | | |
|---|---|---|---|---|
| 8,560,331 | B1* | 10/2013 | Pereira | H04N 21/431 |
| | | | | 704/503 |
| 10,103,839 | B2* | 10/2018 | Nikkila | G10L 19/005 |
| 2002/0009000 | A1* | 1/2002 | Goldberg | G06F 21/10 |
| | | | | 365/200 |
| 2013/0308874 | A1* | 11/2013 | Togashi | H04N 19/80 |
| | | | | 382/264 |
| 2015/0172669 | A1* | 6/2015 | Nishiyama | H04N 19/136 |
| | | | | 375/240.08 |

* cited by examiner

LOW LATENCY AUDIO STREAM ACCELERATION BY SELECTIVELY DROPPING AND BLENDING AUDIO BLOCKS

FIELD OF THE DISCLOSURE

The current disclosure relates to streaming audio programs. More specifically the current disclosure relates to accelerated processing of time constrained audio streams.

BACKGROUND OF THE INVENTION

In a streaming audio asset there are often times constraints on processing of the audio asset such that a large buffer of audio information cannot be maintained. These constraints may either be due to physical limitations of the system or constraints within the program streaming the audio asset.

One such situation where there are constraints on the amount of information that can be buffered is in the context of cloud based emulation. In a cloud-based emulation system the majority of the processing takes place on the remote cloud-based server. This allows the client device platform that is communicating with the cloud-based server to use less resources for processing the cloud based game. Current techniques implement incremental buffering to make the game load faster and parallel processing between the server and the client. However as a result of this arrangement communication between the client device and the server must be synchronized and the client device can only maintain a small buffer to of emulated information. If the client device and the server are not synchronized it may result in unusual or unexpected device behavior. Sometimes audio blocks that are sent through the network are lost or the system requires additional time to process the audio which results in a loss of synchronization. Thus there is a need in the art for a way to accelerate processing audio to ensure synchronization and improve loading times for audio assets.

BRIEF DESCRIPTION OF THE DRAWINGS

The teachings of the present invention can be readily understood by considering the following detailed description in conjunction with the accompanying drawings, in which.

INTRODUCTION

Depending on the frequency of the sound the human ear can distinguish meaningful short changes in frequency as fast as 2 ms. Though research in this field is ongoing some limits have been found empirically. Detection of meaningful changes in frequency by the human ear varies greatly depending on the frequency of the waveform in question. For example an audible low frequency bass signal at 40 (Hertz) Hz measures 25 milliseconds (ms) crest to crest. It would take more than 50 ms to produce a meaningful sound that would be recognized as something other than noise. Conversely a high frequency waveform of 15 kilohertz (kHz) becomes recognizable sound much sooner, at around 2 ms. When streaming audio a continuous soundwave is parsed in to samples which are packaged in to discrete packets or audio blocks and sent over the network to a client. The client device receives the audio block and processes it to place the audio block in a form which is readily playable on the client device. In prior art systems the client device may include a large buffer of audio blocks which are processed before playback. In this way prior art systems were able to maintain synchronization of playback and processing because playback is generally slower than processing and any time processing slowed down there was a large buffer before playback needs to stop and wait for processing to finish. There are situations where systems cannot maintain a large buffer for example in systems with small amounts of physical memory or in systems that must maintain synchronization with a server; these limitations are referred to herein as real time constraints. In these instances audio processing may be accelerated if the system can select and drop certain audio blocks before they are processed without a user noticing the effects of the dropped audio block.

DETAILED DESCRIPTION

Although the following detailed description contains many specific details for the purposes of illustration, anyone of ordinary skill in the art will appreciate that many variations and alterations to the following details are within the scope of the invention. Accordingly, various implementations of aspects of the present disclosure described below are set forth without any loss of generality to, and without imposing limitations upon, the claimed invention.

Figure 1:
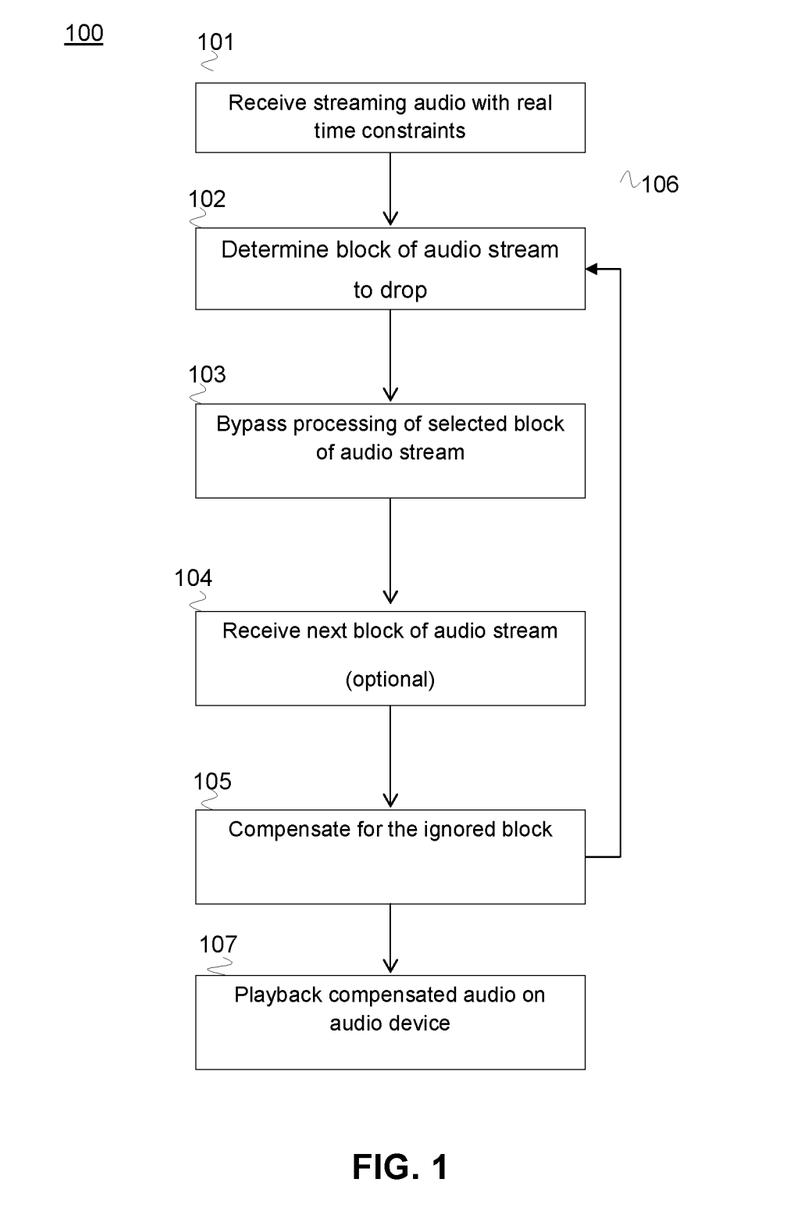
FIG. 1 is a flow diagram of a method for accelerated processing of audio according to aspects of the present disclosure.

FIG. 1 shows a method 100 for selectively dropping and blending audio blocks for acceleration of an audio stream. Initially a device may receive or generate an audio stream, as indicated at 101. The audio stream may be composed of a series of packets or audio blocks containing audio information. The packets or audio block size may be predefined by the networking protocol or underlying standard for convenience and to provide minimal latency impact. As an added benefit these packet or block sizes are usually well aligned with the minimum audio latency response of the underlying systems. In other embodiments the packet or audio block size may be defined by the system to maximize the perceived audio quality when dropping blocks according to aspects of the present disclosure. It should be noted that using audio block sizes that are not a factorial of the block size of the system inherently increases the latency of processing. Additionally the audio stream may be subject to real time constraints that limit the amount of buffered information that may be kept for the stream or the amount of time before the audio is played back.

Figure 8:
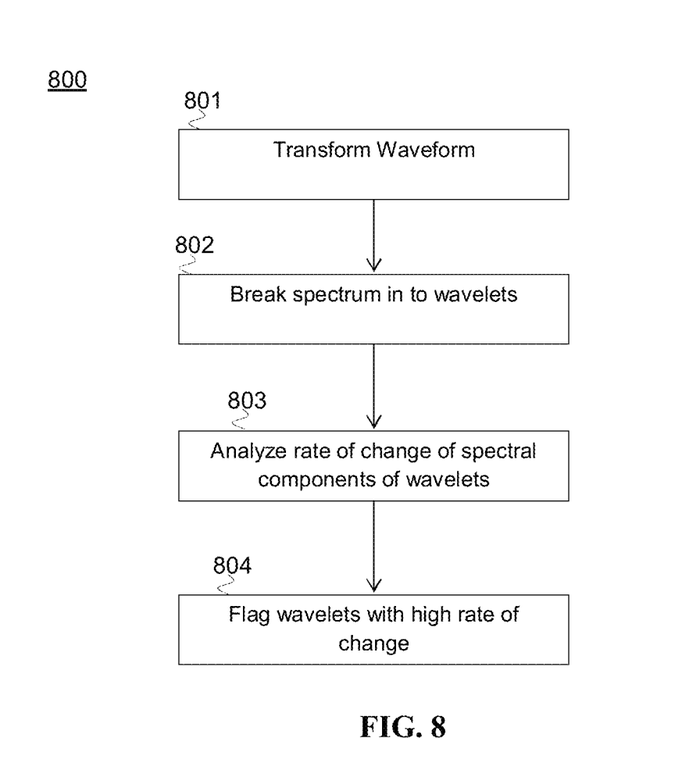
FIG. 8 is a flow diagram showing the method for determining the location to drop an audio block using signal analysis according to aspects of the present disclosure.

The device may determine a location in the audio stream to drop an audio block, as indicated at 102 such as an audio block that has no dependencies or a block for which there is or is not a large audio level difference between the end of previous block and the beginning of the next block. In one embodiment the location to drop an audio block is determined from signal analysis which may better be understood with respect to FIG. 8. The location to drop a block may be determined by transforming the waveform 801 into frequency and time domains using known methods such as Fourier transform (DFT), discrete cosine transform (DCT), or discrete wavelet transform (DWT) analysis. In analysis of the transform, the wave spectra of each audio block is chopped 802 in to wavelets and distinct the change between wavelets is measured 803, blocks that exhibit a high degree of changes over time are flagged and may not be dropped 804. A high degree of rate of change may be determined by a threshold. The device may be configured to drop audio blocks at a set interval to accelerate audio processing hereinafter referred to as a drop interval. In an embodiment if the block determined to be dropped by the block interval is flagged as having a high rate of change the system will choose the next block in the stream, in a different embodiment the system may choose the previous block in the stream. The drop interval may be determined by the system based on latency constraints for example when the system determines high latency in processing blocks, the drop interval may be reduced. Conversely the system may increase the drop interval when it is determined that the latency is low. In an alternative embodiment the device may have a predetermined threshold for audio levels and when the audio level is below that threshold the device may drop blocks. The device may also have some combination of audio level threshold and drop interval.

Figure 9:
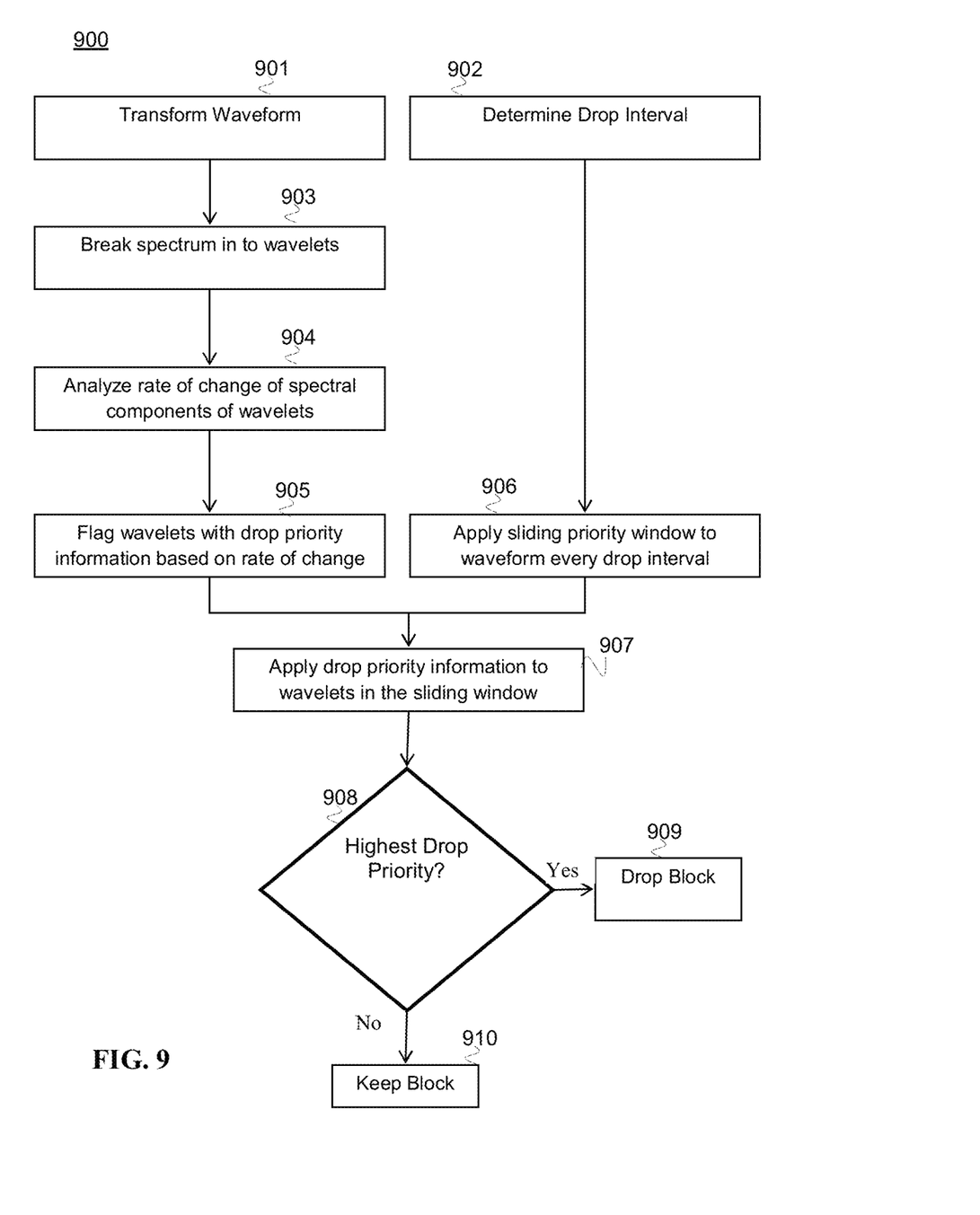
FIG. 9 is a flow diagram depicting a method for determining blocks to be dropped according to aspects of the present disclosure.

FIG. 9 shows a method for determining blocks to be dropped according to an embodiment of the present disclosure. The method may begin with determining the drop interval 902 from latency information as discussed above. Signal analysis as discussed above may be used to transform the waveform into frequency time domain waves 901, break the waves into wavelets 903 and analyze the rate of change of the wavelets 904. From the rate of change information a drop priority flag may be applied to each audio block 905 which indicates the amount of changes over time. Blocks with a high degree of change will be flagged as low priority blocks whereas blocks with a low degree of change will be flagged with a higher priority. The system may use the drop interval to set a sliding priority window 906. The system applies the drop priority flags to each of the blocks within the sliding priority window 907. Within the sliding priority window the system determines which blocks drop 908 by comparing the drop priority flag values of each block. The block with the highest priority 909 (i.e. the block with the lowest amount of changes over time) will be dropped and the other lower priority blocks will be kept 910. The size of the priority window can be of any length but it is preferable that the perceived latency of the system is reduced. Ideally the priority window is under 40 ms. In this case, the drop interval may set the length of time between each priority window.

Figure 10:
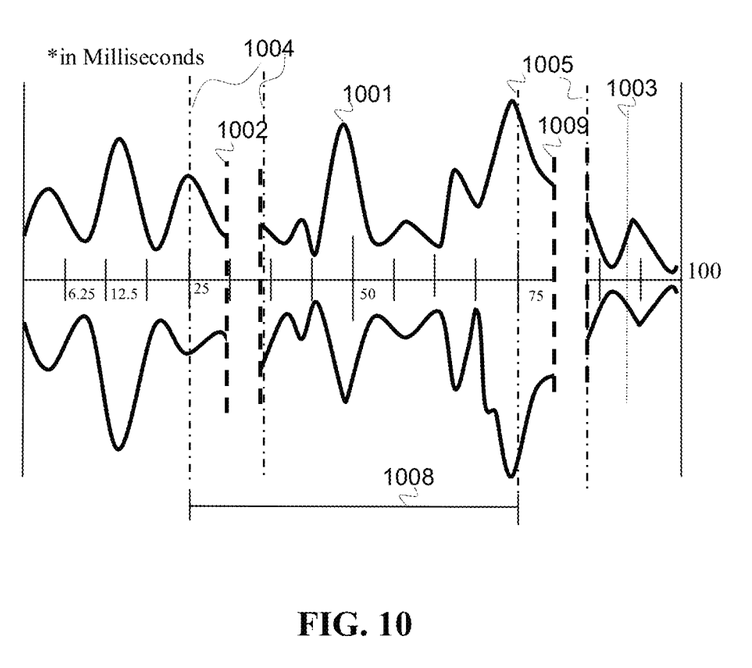
FIG. 10 is a line graph of a sound wave with dropped blocks within a sliding priority frame according to aspects of the present disclosure.

Aspects of the method of FIG. 9 may better be under with respect to FIG. 10. A waveform 1001 of streaming audio content is depicted. Line 1003 represents the amount of streaming audio that has been stored in memory. The 1004 and 1005 represent the sliding priority frame. The sliding priority frames occur every drop interval 1008. Within the sliding priority frame the block with the highest drop priority is dropped 1009.

Once the device has determined that dropping an audio block is appropriate, the device may start dropping audio blocks. To drop an audio block the device may bypass processing of the block, as indicated at 103. Alternatively the device may initially receive the unprocessed audio block in a buffer and allow the unprocessed audio block to be over-written by the next audio block. The device may then receive the next audio block after the dropped block, as indicated at 104 and process it for playback. A key concept of the present disclosure is that the described system does not add any additional latency to the processing of audio received over the network. Once an audio packet has been received from the network and decompressed, the client can analyze and cut from the stream without incurring any additional latency.

Figure 7:
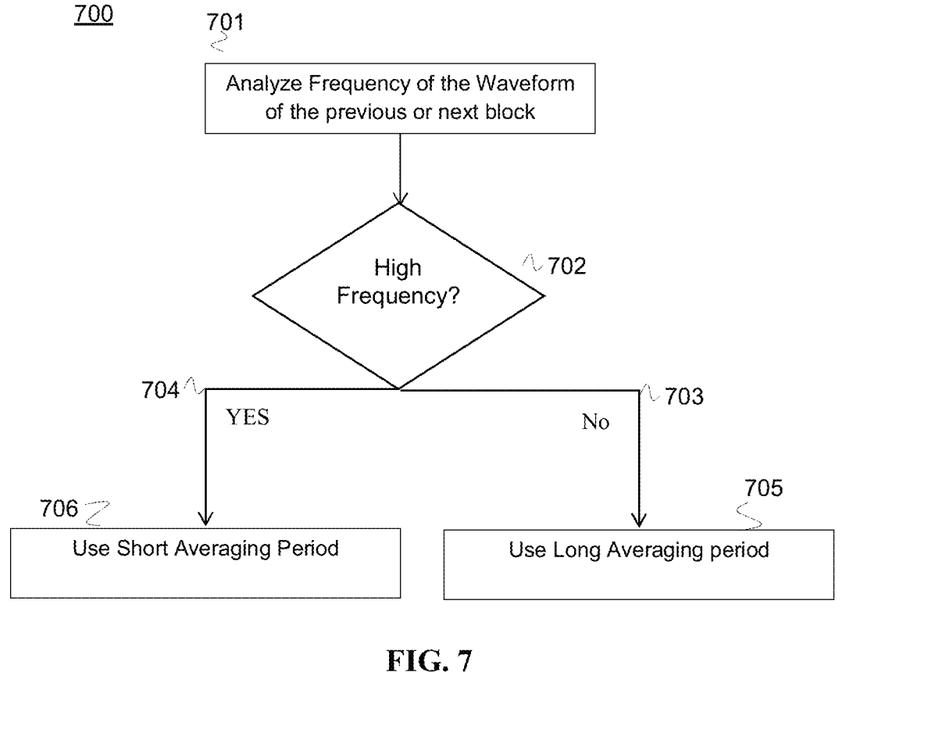
FIG. 7 is a flow diagram showing the method for determining the length of audio levels to modify using wave for analysis according to aspects of the present disclosure.

The device may compensate for the dropped audio block 105 by reducing the difference in audio level between the end of the prior audio block and the beginning of the next audio block. By way of example and not by way of limitation the device may simply average the last set samples of the prior audio block with initial set sample of the next audio block and adjust the values of those samples towards that average. In some embodiments only the end of the prior audio block is averaged. In other embodiments only the beginning of the next audio block is averaged. The number of samples used for the average may be determined empirically to find the most natural sounding way to bridge a dropped block. For example it has been found that pops and clicks are effectively removed by averaging audio of only 0.02 ms in length. In other embodiments wave form analysis is performed to determine the length of audio levels to modify as seen in FIG. 7. The frequency of the previous audio block or blocks is analyzed 701. If the analysis determines 702 that the wave form is low frequency 703, a longer period of averaging may be chosen 705 for a better match to the original spectra. Conversely if the waveform is determined 702 to be high frequency 704 then a very short period of averaging or no averaging will be chosen 706. By way of example and not by way of limitation for a low frequency waveform the system may choose an averaging period equal to or less than 0.06 ms and for high frequency waveforms the system may choose an averaging period equal to or less than 0.005 ms. According to alternate aspects of the present disclosure there may be greater than two averaging periods, for example there may be averaging periods for low, middle and high frequency waveforms or there may be a number of averaging periods corresponding to wave form frequencies chosen to best approximate the underlying waveforms without noticeably interfering with the user experience.

In some implementation the gap in audio level created by the dropped block may be filled by interpolating the waveform using wavelet analysis. In some embodiments the length of interpolation is chosen based on the frequency of the wave form. As discussed above a longer period of the interpolation calculation will be chosen for a lower frequency waveform and short period of interpolation will be chosen for a high frequency audio wave form.

Once the device has dropped a block and compensated for the dropped block as discussed above it may play the audio, as indicated at 107 and/or return to receiving and/or generating audio blocks as normal, as indicated at 106.

Figure 2:
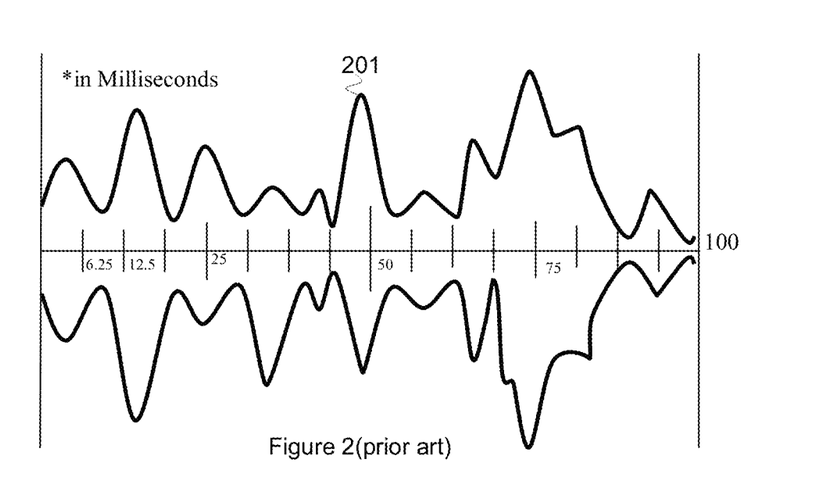
FIG. 2 is a line graph of a prior art sound wave according to an aspect of the present disclosure.

FIG. 2 shows graph of audio level versus time depicting 100 milliseconds of a sound wave 201. In this depiction the wave is shown as a continuous line but it should be understood that in certain embodiments the wave may be composed of a multiple samples of audio information. For example a typical Compact Disk quality MP3 audio file is composed of 44100 samples per second.

Figure 3:
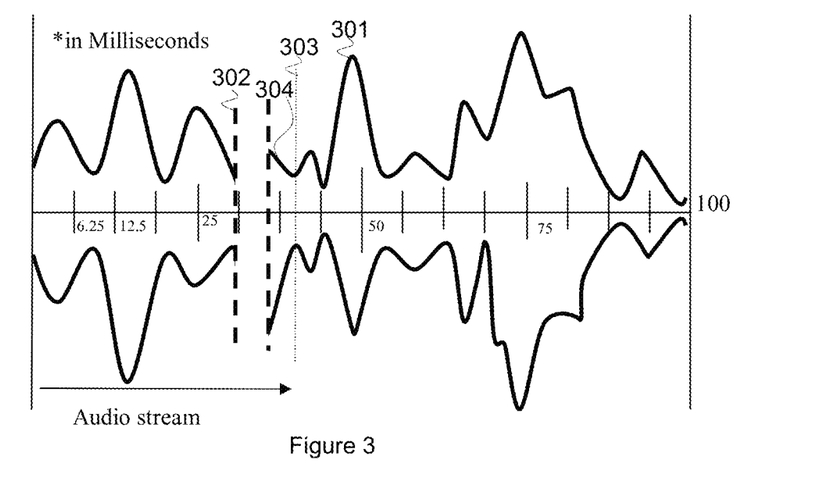
FIG. 3 is a line graph of a sound wave with a dropped audio block according to an aspect of the present disclosure.

FIG. 3 depicts a soundwave 301 with a dropped block 302 according to aspects of the present disclosure. In the illustrated example, the dropped block 302 lasts for 5 milliseconds but in other embodiments the block may be as short as 2 milliseconds or as long as 25 milliseconds. In this depiction the audio is streaming as represented by the dotted line 303. The device already decided to drop a block 302 and has received the next audio block 304 after the dropped block 302. The devices has not yet compensated for the dropped block 302.

It should be understood that there is no minimum length for dropped blocks but as the number of dropped blocks increase and the length of the dropped blocks shortens the human ear begins to perceive the sound at a higher frequency. For example if the dropped block length was 0.01 ms and every other block was dropped the perceived audio would sound accelerated and at a very high pitch. Currently the optimal block length is between 3 ms and 7 ms. In current multimedia systems block lengths of greater than 16 ms are not found because 16 ms corresponds to the current industry standard for video of 60 frames per seconds.

Figure 4:
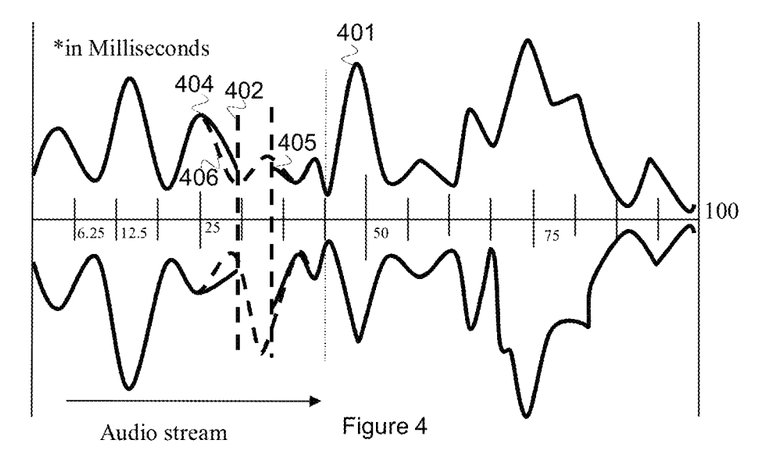
FIG. 4 is a line graph of a sound wave with a dropped audio block and compensation with line fitting according to an aspect of the present disclosure.

FIG. 4 depicts a soundwave 401 with a dropped block 402 and compensation according to aspects of the present disclosure. In the disclosed embodiment the tail end of the previous block 404 and the beginning of the next block 405 have been averaged to eliminate user perception of the dropped block. By averaging the beginning and end of the blocks the user's perception of clicks and pops may be reduced or eliminated completely. The dashed line represents the original audio 406 and is included to show the difference between the original audio 406 and the dropped block-compensated audio 401.

Figure 5:
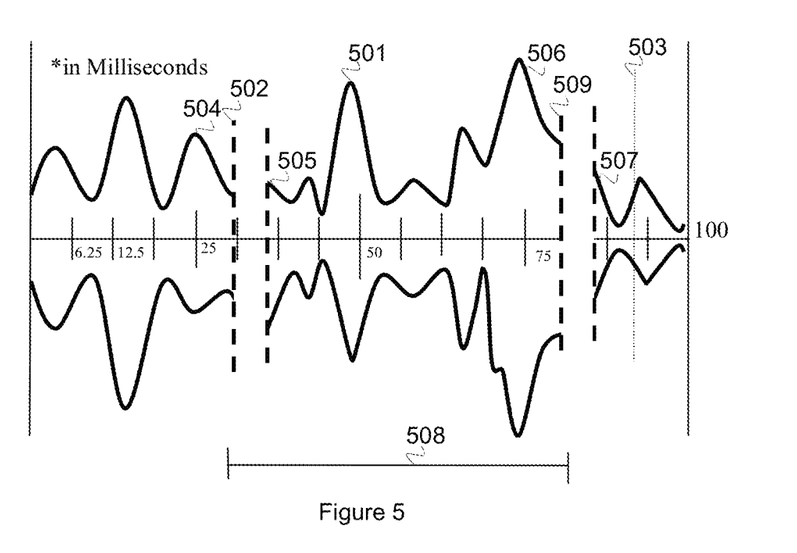
FIG. 5 is a line graph of a soundwave with two dropped audio blocks and compensation according to aspects of the present disclosure.

FIG. 5 shows a soundwave 501 with two dropped blocks 502, 509 and compensation according to aspects of the present disclosure. In this embodiment the device has streamed 94 ms of audio 503. The device is configured with a drop interval 508 by way of example and not by way of limitation the device may be configured to drop blocks at a 50 ms interval. The interval may be determined experimentally to find the optimal number of dropped blocks to provide desired level of audio acceleration without a perceived audio quality loss. The device has identified and dropped a first audio block 502 and averaged the end of the previous audio block 504 with the beginning of the next audio block 505 and averaged the beginning of the next audio block 505 with the previous audio block 504 to compensate for the dropped audio. The device has then continued streaming audio till the end of the interval 508. At which point the device drops another audio block 509. After receiving the beginning of the next audio block 507 the device averages the end of the previous un-dropped audio block 506 by the beginning of the next audio block 507 and the beginning of the next audio block 507 with the end of the previous audio block 506 to compensate for the dropped block. At which point the device is able to play back the compensated audio.

Figure 6:
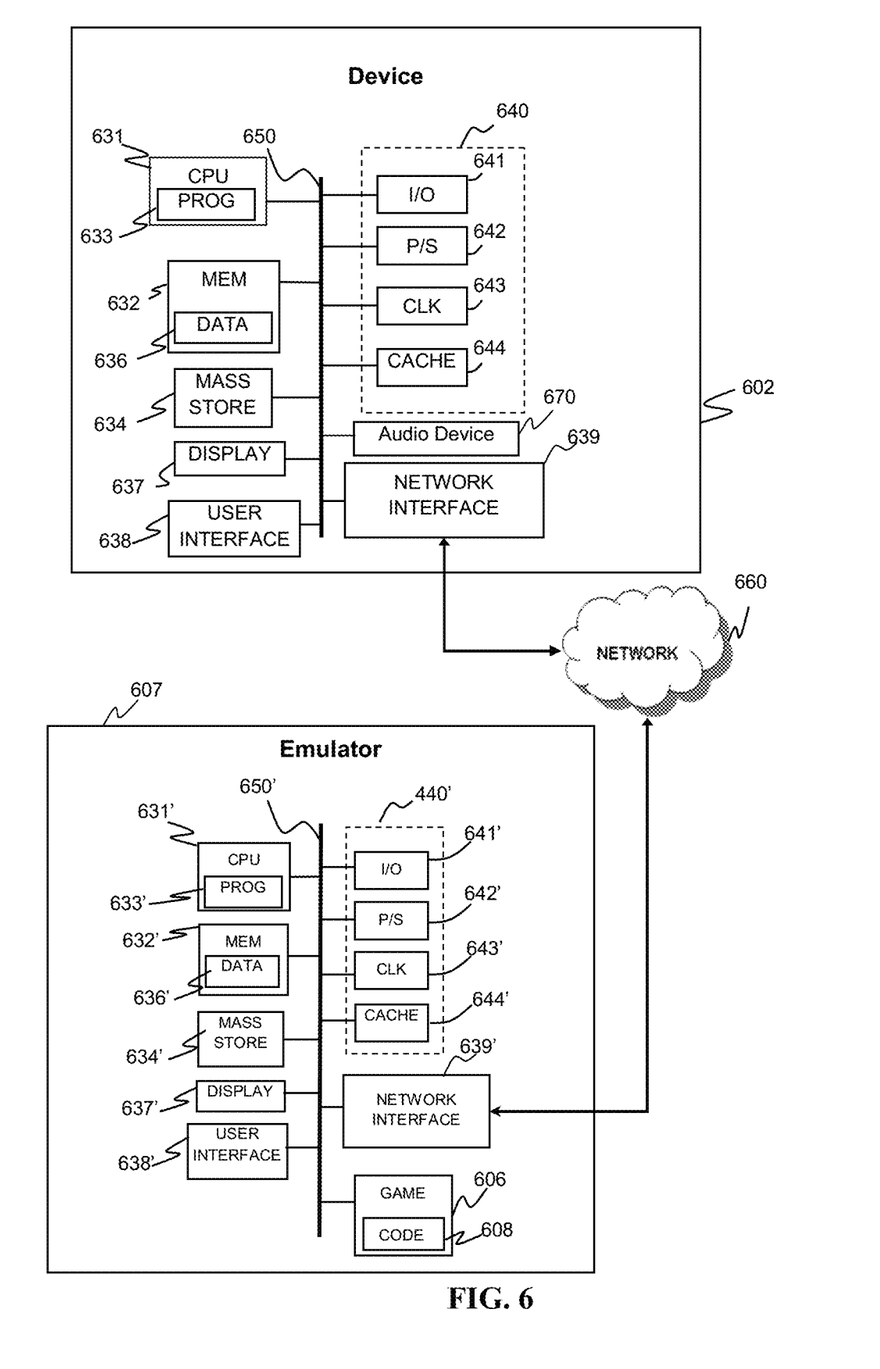
FIG. 6 is a block diagram of a system that implements the method for audio acceleration according to aspects of the present disclosure.

The block diagram shown in FIG. 6 schematically illustrates certain aspects of the present disclosure within the particular context of remote emulation. In this example, an emulator 607 may be accessed by a device 602 over a network 660. The device 602 may access alternative remote emulators 607 over the network 660 (herein referred to as remote emulators). Emulators 607 may be identical to each other, or they may each be programmed to emulate unique legacy programs 606 including unique legacy games 606.

The device 602 may include a central processor unit (CPU) 631. By way of example, a CPU 631 may include one or more processors, which may be configured according to, e.g., a dual-core, quad-core, multi-core, or Cell processor architecture. The device 602 may also include a memory 632 (e.g., RAM, DRAM, ROM, and the like). The CPU 631 may execute a process-control program 633, portions of which may be stored in the memory 632. The device 602 may also include well-known support circuits 640, such as input/output (I/O) circuits 641, power supplies (P/S) 642, a clock (CLK) 643 and cache 644. The device 602 may optionally include a mass storage device 634 such as a disk drive, CD-ROM drive, tape drive, or the like to store programs and/or data. The device 602 may also optionally include a display unit 637 and a user interface unit 638 to facilitate interaction between the device 602 and a user who requires direct access to the device 602. The display unit 637 may be in the form of a cathode ray tube (CRT) or flat panel screen that displays text, numerals, or graphical symbols. The user interface unit 638 may include a keyboard, mouse, joystick, light pen, or other input devices. Additionally the device may include an audio device 670 for the playback or recording of audio waveforms. Such audio devices may include speakers, microphones, oscilloscopes, phonographs and other sound playback/recording media. The device 602 may control the audio device through appropriate driver software, which may be stored in the memory 632 and/or storage device 634 and executed by the CPU 631. The device 602 may include a network interface 639, configured to enable the use of Wi-Fi, an Ethernet port, or other communication methods.

The network interface 639 may incorporate suitable hardware, software, firmware or some combination of two or more of these to facilitate communication via an electronic communications network 660. The network interface 639 may be configured to implement wired or wireless communication over local area networks and wide area networks such as the Internet. The device 602 may send and receive data and/or requests for files via one or more data packets over the network 660.

The preceding components may exchange signals with each other via an internal system bus 650. The device 602 may be a general purpose computer that becomes a special purpose computer when running code that implements embodiments of the present invention as described herein.

The emulator 607 may include a central processor unit (CPU) 631'. By way of example, a CPU 631' may include one or more processors, which may be configured according to, e.g., a dual-core, quad-core, multi-core, or Cell processor architecture. The emulator 607 may also include a memory 632' (e.g., RAM, DRAM, ROM, and the like). The CPU 631' may execute a process-control program 633', portions of which may be stored in the memory 632'. The emulator 607 may also include well-known support circuits 640', such as input/output (I/O) circuits 641', power supplies (P/S) 642', a clock (CLK) 643' and cache 644'. The emulator 607 may optionally include a mass storage device 634' such as a disk drive, CD-ROM drive, tape drive, or the like to store programs and/or data. The emulator 607 may also optionally include a display device 637' and user interface unit 638' to facilitate interaction between the emulator 607 and a user who requires direct access to the emulator 607. By way of example and not by way of limitation a device or engineer 602 may need direct access to the emulator 607 in order to program the emulator 607 to properly emulate a desired legacy program 606 or to add additional capabilities to a legacy program 606. The display device 637' may be in the form of a cathode ray tube (CRT) or flat panel screen that displays text, numerals, or graphical symbols. The user interface unit 638' may include a keyboard, mouse, joystick, light pen, or other device. The emulator 607 may include a network interface 639', configured to enable the use of Wi-Fi, an Ethernet port, or other communication methods.

The network interface 639' may incorporate suitable hardware, software, firmware or some combination of two or more of these to facilitate communication via the electronic communications network 660. The network interface 639' may be configured to implement wired or wireless communication over local area networks and wide area networks such as the Internet. The emulator 607 may send and receive data and/or requests for files via one or more data packets over the network 660.

The emulator 607 may be a general purpose computer that becomes a special purpose computer when running code that implements embodiments of the present invention as described herein.

Emulator 607 may access a legacy program 606 that has been selected by the device 602 for emulation through the internal system bus 650'. There may be more than one legacy program 606 stored in the emulator. The legacy programs may also be stored in the memory 632' or in the mass storage device 634'. Additionally, one or more legacy programs 606 may be stored at a remote location accessible to the emulator 607 over the network 660. Each legacy game 606 contains game code and legacy audio 608.

The game code 608 may contain un-accelerated audio that is sent from the emulator 607 to the device 602. The device 602 may have real time constraints and implement the disclosed method for accelerating audio 100.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for accelerated audio processing in a streaming environment the method comprising:
   a) locating a position to ignore processing of an audio block of a streaming audio asset including:
      I) deriving a transformation of the audio block;
      II) breaking the audio block transform into wavelets; and
      III) deriving a rate of change of the wavelets;
   b) ignoring the audio block chosen in a);
   c) compensating for the ignored audio block to generate compensated audio;
   d) playing the compensated audio through an audio device.

2. The method of claim 1 further comprising IV) flagging at least one audio block with a drop priority based on the rate of change of the wavelets.

3. The method of claim 2 wherein an audio block prior or after, the audio block flagged with a drop priority, is ignored.

4. The method of claim 2 further comprising establishing a sliding priority window and comparing the audio blocks within the sliding priority window to determine which block is flagged with highest drop priority, wherein the audio block with the highest drop priority is ignored in b) and wherein the drop priority describes the amount of change in the audio block.

5. The method of claim 4 further comprising receiving additional audio blocks in the streaming audio asset and repeating steps a) through d) at a predetermined interval.

6. The method of claim 1 further comprising receiving additional audio blocks in the streaming audio asset and repeating steps a) through d) at a predetermined interval.

7. The method from claim 1 wherein locating a position at a) comprises determining whether the audio satisfies a threshold condition.

8. The method from claim 1 wherein locating a position at a) comprises determining whether the audio block is dependent on another audio block or data source.

9. The method of claim 1 wherein the ignored audio block in, b) is less than 5 ms long.

10. The method of claim 1 wherein compensating at d) comprises averaging an end of a prior audio block that is immediately before the ignored audio block with a beginning of the next audio block.

11. The method of claim 10 wherein the beginning of the next audio block is averaged with the end of the prior audio block.

12. The method of claim 10 wherein an amount of the end of the prior audio block and the beginning of the next audio block that is averaged is between 0.005 milliseconds (ms) and 0.06 ms respectively.

13. The method of claim 10 wherein frequency analysis is applied to the audio block immediately before the ignored audio block to determine the amount of the end of the prior audio block to be averaged with the beginning of the next audio block.

14. The method of claim 13 wherein the frequency next audio block is also analyzed to determine the amount of the beginning next audio block to be averaged with the end of the prior audio block.

15. The Method of claim 14 wherein a greater amount of the end of the prior audio block and the beginning of the next audio block is averaged at a lower frequency than at a higher frequency.

16. The Method of claim 14 wherein a smaller amount of the end of the prior audio block and the beginning of the next audio block is averaged at a higher frequency than at a lower frequency.

17. The Method of claim 14 wherein at a higher frequency the end of the prior audio block and the beginning of the next audio block are not averaged.

18. The method of claim 1 wherein the audio device is a videogame console.

19. A device, comprising:
   a CPU;
   an audio device;
   a Memory coupled to the CPU, and non-transitory instructions embedded in memory which when executed cause the CPU to enact the method for accelerated processing of audio comprising:
  a) locating a position to ignore processing of an audio block of the streaming audio asset including:
    I) deriving a transformation of the audio block;
    II) breaking the audio block transform into wavelets; and
    III) deriving a rate of change of the wavelets;
  b) ignoring the audio block chosen in a);
  c) compensating for the ignored audio block;
  d) playing the compensated audio through the audio device.

20. A non-transitory computer-readable medium having embodied therein coded instructions executable by a computer processor, the coded instructions being configured to implement a method for accelerated processing of audio, the method comprising:
  a) locating a position to ignore processing of an audio block of the streaming audio asset including:
    I) deriving a transformation of the audio block;
    II) breaking the audio block transform into wavelets, and
    III) deriving a rate of change of the wavelets;
  b) ignoring the audio block chosen in b);
  c) compensating for the ignored audio block;
  d) playing the compensated audio on an audio device.

\* \* \* \* \*

UNITED STATES PATENT AND TRADEMARK OFFICE
CERTIFICATE OF CORRECTION

PATENT NO.          : 10,726,851 B2
APPLICATION NO.     : 15/693184
DATED               : July 28, 2020
INVENTOR(S)         : Geoffrey Piers Robert Norton et al.

Page 1 of 1

It is certified that error appears in the above-identified patent and that said Letters Patent is hereby corrected as shown below:

In the Claims

In Claim 20 at Column 9, Line 25 the second occurrence of "b)" should be changed to "a)".

Signed and Sealed this
First Day of September, 2020

Andrei Iancu
*Director of the United States Patent and Trademark Office*